United States Patent [19]

Singh

[11] 4,203,327
[45] May 20, 1980

[54] PIEZORESISTIVE SILICON STRAIN SENSORS AND PRESSURE TRANSDUCERS INCORPORATING THEM

[75] Inventor: Gurnam Singh, Willow Grove, Pa.

[73] Assignee: Honeywell Inc., Minneapolis, Minn.

[21] Appl. No.: 920,538

[22] Filed: Jun. 29, 1978

[51] Int. Cl.$^2$ .............................................. G01L 9/06
[52] U.S. Cl. ..................................... 73/721; 73/727; 73/777; 338/2; 338/4
[58] Field of Search ............... 73/721, 727, 754, 777; 338/4, 3, 2, 42; 357/26

[56] References Cited

U.S. PATENT DOCUMENTS

| | | | |
|---|---|---|---|
| 3,230,763 | 1/1966 | Frantzis | 73/727 |
| 3,712,143 | 1/1973 | Weaver et al. | 73/721 |
| 3,800,264 | 3/1974 | Kurtz et al. | 338/3 |

OTHER PUBLICATIONS

"Spinel May Make MOS Faster Than T$^2$L", by R. H. Cushman, *Electronic Design News*, Jan. 15, 1971, pp. 35-42.
Cullen, "The Preparation and Properties of Chemically Vapor Deposited Silicon on Sapphire and Spinel", *Journal of Crystal Growth* 9 (1971), pp. 107-125.

*Primary Examiner*—Donald O. Woodiel
*Attorney, Agent, or Firm*—Laurence J. Marhoefer; Lockwood D. Burton

[57] ABSTRACT

Each sensor consists of a spinel substrate in the form of a beam or a diaphragm which carries a pattern of a plurality of doped silicon piezoresistive resistors. The latter are formed from layers of doped silicon, each of which layers has been epitaxially grown on a corresponding surface of the spinel substrate. The spinel minimizes the occurrence of leakage currents with respect to the resistors, while cooperating with the silicon to provide a high degree of stress transmission to the resistors. The beam form of sensor is shown as the sensor member of a differential fluid pressure to electric signal transducer, wherein the sensor is deflected and strained in accordance with the differential pressure to be sensed.

12 Claims, 5 Drawing Figures

PIEZORESISTIVE SILICON STRAIN SENSORS AND PRESSURE TRANSDUCERS INCORPORATING THEM

CROSS-REFERENCE TO RELATED APPLICATION

Subject matter disclosed but not claimed herein is disclosed and claimed in copending application Ser. No. 838,538, filed Oct. 3, 1977.

BACKGROUND OF THE INVENTION

1. FIELD OF THE INVENTION

The present invention relates to stress-sensitive semiconductor devices of the type which have become known in the art as semiconductor strain gauge elements, strain gauges, or strain sensors. More specifically, the invention relates to the so-called silicon strain sensors, wherein the strain is sensed by a pattern of one or more piezoresistive elements or resistors which are formed in a body or a layer of silicon. Such a resistor pattern produces an electrical resistance change output signal which represents the strain experienced by the sensor. Still more specifically, the invention relates to those forms of such strain sensors which are particularly useful as the sensor or transducer elements of fluid pressure to electric signal transducers or transmitters.

2. DESCRIPTION OF THE PRIOR ART

Many forms and configurations of silicon strain sensors, and numerous forms of fluid pressure transducers employing such sensors, are known in the art. The usual practice in constructing such sensors is to form the desired piezoresistive resistors, by the usual diffusion or ion implantation techniques, in or on the surface or surfaces of a body of silicon having the dimensions that are required for the particular application. Such sensors will be referred to hereinafter as silicon on silicon sensors. The resistors so formed are generally connected as the arms of a bridge circuit. This may be done either on the sensor itself or external to the sensor. The bridge output signal represents the resistance changes or output signals of the resistors and hence the strain experienced by the resistors and the body, and is usually used to actuate appropriate indicating and/or controlling apparatus.

To permit the operation of the resistors in a bridge configuration, the resistors must be crystallographically oriented on the sensor body in such a pattern or patterns that a change in strain causes the resistances of certain of the resistors to change in the direction which is opposite to that in which the resistances of others of the resistors are changed. In the beam type sensor, this is usually accomplished by either orienting the resistors in both longitudinal and transverse crystallographic directions on the same surface of the body, or by orienting the resistors in the same crystallographic direction on oppositely strained surfaces of the body. Such crystallographic directions will be referred to hereinafter simply as directions.

An example of a typical one of such sensors employed in a typical pressure transducer is the beam type sensor and transducer combination which is disclosed in the Whitehead et al U.S. Pat. No. 3,780,588. An example of a typical diaphragm form of such sensors, for use in the diaphragm type of pressure transducer, is the sensor which is disclosed in the Frantzis U.S. Pat. No. 3,230,763.

It has been found that the operation of such silicon on silicon sensors becomes unreliable when the sensors are operated in environments which expose them to operating temperatures in excess of 230° F. and/or to nuclear radiation. This is particularly true for those applications in which a high degree of measurement precision is required. It is known that this unreliability results mainly from the unavoidable presence of np or pn junctions which exist between the resistor pattern and the bulk silicon which carries it. Those junctions permit the flow of leakage currents which degrade the sensor output signals to an extent which is dependent upon the ambient temperature and radiation levels.

It has been proposed in the past to avoid the above-noted undesirable operation by replacing the silicon member or body with a corresponding body or substrate of sapphire, by growing an epitaxial layer of silicon on each surface of the sapphire member which is to carry a piezoresistive resistor pattern, and by forming each such a pattern from the corresponding silicon layer. Since the sapphire substrate in such a sensor construction is an electrical insulator, the above-noted np and pn junctions are not present. Accordingly, such a silicon on sapphire sensor construction is not subject to the subject to the above-noted leakage currents and unreliable operation.

Such a silicon on sapphire strain sensor has the practical disadvantage, however, of having only about one-half the sensitivity of its silicon on silicon counterpart. That is, a silicon on sapphire sensor possesses the shortcoming of producing only about one-half as much change in output effect or signal for a given change in applied force and deflection as is produced by an equivalent silicon on silicon sensor operating under the same conditions.

SUMMARY OF THE INVENTION

Accordingly, it is an object of the present invention to provide an improved silicon strain gauge or sensor which is not characterized by the above-noted shortcomings of the known forms of such sensors. Specifically, it is an object of the invention to provide such an improved sensor which does not exhibit the above-noted unreliable operation of the silicon on silicon sensors, and yet does not exhibit the above-noted undesirable lower sensitivity of the silicon on sapphire sensors. A further object of the invention is to provide such an improved sensor wherein the desired degrees of piezoresistive effects are as readily achieved as they are in the previously known sensor constructions. Another object of the invention is to provide improved fluid pressure to electric signal transducers employing said improved sensors.

To the end of accomplishing the above-noted and other desirable objects, the improved sensor according to the invention includes a member, body, or substrate of spinel. An epitaxial layer or film of silicon is grown on each surface of the spinel member which is to carry a piezoresistive resistor pattern. This growth may well be accomplished by employing the technique which is used to grow silicon on spinel in the manufacture of integrated circuits. Each of the appropriate piezoresistive resistor patterns is then formed by appropriately processing the corresponding one of the grown silicon layers. I have discovered that such use of spinel yields a sensor which exhibits substantially the same sensitivity as that exhibited by its silicon on silicon counterpart, and yet exhibits the desired freedom from leakage currents which is obtained with a silicon on sapphire sensor. Moreover, the silicon on spinel construction makes available the same silicon resistor crystallographic planes and directions as are obtainable for the known sensor constructions, whereby the desired degrees of piezoresistive effects are readily achievable with the silicon on spinel construction.

BRIEF DESCRIPTION OF THE DRAWING

A better understanding of the present invention may be had from the following detailed description when read in connection with the accompanying drawing, wherein.

DETAILED DESCRIPTION

THE SENSOR OF FIGS. 1 AND 2

Figure 1:
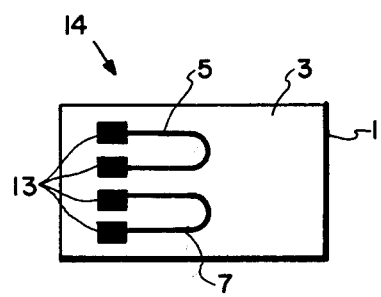
FIG. 1 is a diagrammatic top view of a beam type of sensor constructed according to the present invention.
Figure 2:
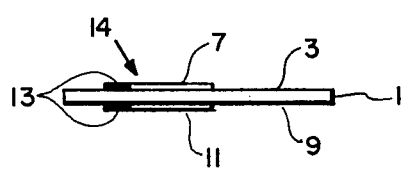
FIG. 2 is a front elevation of the sensor of FIG. 1.

The sensor which is diagrammatically shown in FIGS. 1 and 2 is a preferred embodiment of the present invention and constitutes a preferred example of the beam form of the above-noted improved sensor. Thus, the sensor of FIGS. 1 and 2 includes a spinel body or substrate 1 which is in the form of a slab or beam. The upper face or surface 3 of the beam 1 carries a pattern of two piezoresistive resistors which are shown schematically at 5 and 7 as being formed in the longitudinal direction. The lower face or surface 9 of the beam 1 carries a similar longitudinal resistor pattern which includes a piezoresistive resistor 11 and a resistor, not shown, which corresponds to the resistor 5. Consequently, the sensor is of the above-noted form wherein all of the resistors are oriented in the same direction on oppositely strained surfaces of the body, thereby permitting the resistors to be connected and operated in a bridge configuration.

The above-noted four resistors, forming the two patterns on the beam 1, may well be, and are assumed herein to be, produced in the following manner:

1. A layer or film of silicon which is doped to the desired level, preferably P type silicon because of its enhanced piezoresistive effects, is epitaxially grown on each of the beam surfaces 3 and 9, the doping level being that which will give the desired resistivity to the final resistors;

2. The desired resistor pattern is masked on each of the silicon layers; and

3. The unmasked silicon is removed, thereby leaving the desired silicon resistor pattern on each of the beam surfaces 3 and 9.

To complete the construction of the sensor, suitable terminal pads 13 are produced on the beam 1 in electrical contact with the ends of the resistors 5, etc. Those pads may well be produced by the usual plating process. The complete sensor of FIGS. 1 and 2 has been designated by the reference numeral 14.

As alternatives to the specific resistor orientation illustrated in FIGS. 1 and 2, the resistors 5, etc., may be oriented in others of the known ways on the beam 1. For example, the four resistors may be formed on one of the beam surfaces in both longitudinal and transverse directions, and/or may be interconnected in the bridge configuration directly on the beam surface in the manner shown in the above-listed Frantzis patent. Also, the resistors could be oriented in the transvers direction on both of the surfaces 3 and 9.

The superior operation provided by the sensor 14 as a result of the above-described construction will be described below as it occurs when the sensor 14 is deflected and strained within the pressure transducer of FIG. 3. Accordingly, the construction of the FIG. 3 transducer will be described next.

THE TRANSDUCER OF FIG. 3

Figure 3:
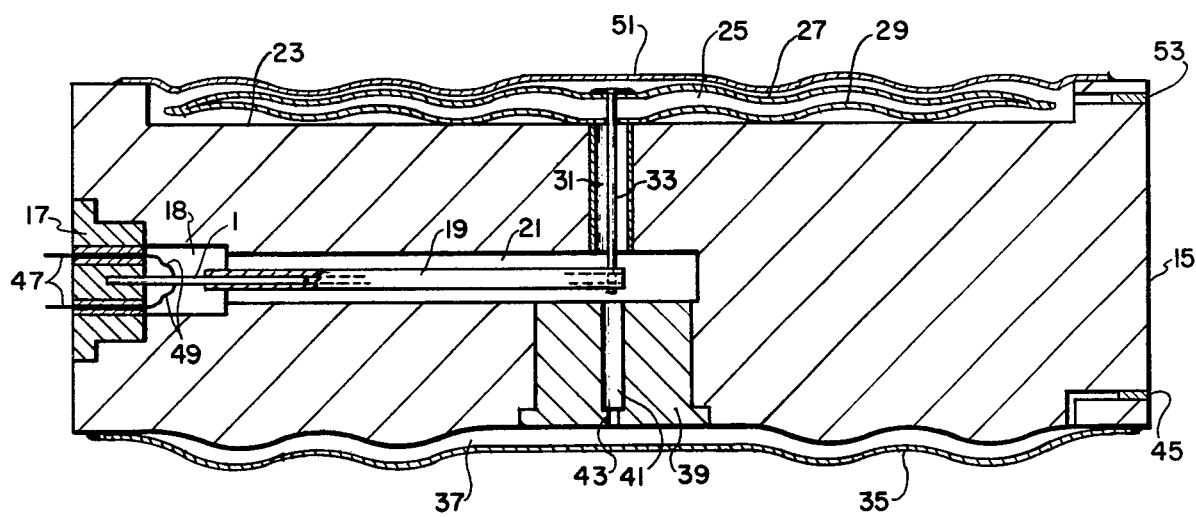
FIG. 3 is a diagrammatic front elevation of a fluid pressure to electric signal transducer which incorporates the sensor of FIGS. 1 and 2.

The transducer of FIG. 3 is of the form which is disclosed in the above-listed copending application, and is included herein as an example of the type of transducer which can advantageously utilize the sensor 14 as its sensor element. The transducer of FIG. 3 consists of a cylindrical metallic block 15 which carries the other portions of the transducer. Those portions include a metallic header 17 which is supported within a recess in the left-hand side of the block 15. The header 17 contains a slot into which the left-hand end of the beam 1 of the sensor 14 is fastened in such a manner that the beam 1 is cantilevered from the header 17 for bending movement of deflection within a chamber 18. The right-hand end of the beam 1 is secured in a slot in the end of a rigid tube 19 which extends to the center of the block 15 within a passageway 21 in the block 15 which is a continuation of the chamber 18.

An upper circular recess in the block 15, having a bottom surface 23, contains a capsule 25. The latter consists of an upper member 27 which is peripherally sealed to a lower member 29. The only opening into the interior of the capsule 25 is a central circular opening in the lower member 29. The latter is secured to the block recess surface 23 in the vicinity of the opening in the member 29 so that said opening is in register with, and is peripherally sealed to, the upper end of a cylindrical central passageway 31 in the block 15. The passageway 31 extends from the surface 23 to the passageway 21. The capsule member 27 is rigidly coupled to the right-hand end of the tube 19 by a rod 33 which lies in the passageway 31 and passes through the opening in the member 29. Specifically, the upper end of the rod 33 is secured to the center of the member 27, and the lower end of the rod 33 is secured to the tube 19.

A circular corrugated barrier diaphragm 35 is peripherally sealed to the lower surface of the block 15 so as to form a chamber 37. A plug 39 is mounted within a central recess in the lower portion of the block 15. The plug 39 contains a cylindrical central passageway 41 which includes a fluid damping restriction 43 and which extends between the chamber 37 and the passageway 21. Consequently, there is a fluid connection between the chamber 37 and the interior of the capsule 25. The volume consisting of the interior of the capsule 25, the passageways 31, 21, and 41, and the chambers 18 and 37, is filled with a suitable incompressible fill fluid. This fluid is introduced through a sealable fill passage 45.

The pads 13 on the beam 1 are electrically connected to the outside world by a suitable number of conductive pins 47 and flexible conductors 49. The pins 47 pass out of the chamber 18 and through the header 17 to the exterior of the block 15. The pins 47 are suitably electrically insulated from the body of the header 17. Each of the pads 13 is connected to the inboard end of a corresponding one of the pins 47 by a corresponding one of the flexible conductors 49. In order to avoid unduly complicating the drawing, only two of the pins 47 and the conductors 49 are shown in FIG. 3.

In practice, the pins 47 will be connected in the known manner to place the resistors 5, etc., in a bridge configuration. The bridge output will be connected to apparatus which responds to the resistor resistance output signals, as represented by the bridge output signal, to provide a measure of the force on and the strain in the beam 1 as sensed by the resistors. Such connections and apparatus may well be of the known form which is disclosed in the above-listed Whitehead et al patent.

The FIG. 3 transducer is also provided with an upper circular corrugated barrier diaphragm 51 which is peripherally sealed to the top of the block 15 so as to close and seal the recess which contains the capsule 25. This sealed recess is filled with a suitable incompressible fluid which is introduced through a sealable fill passage 53.

By way of illustration and example, and not by way of limitation, it is noted that a typical set of dimensions in inches for the beam 1 of the sensor 14 is a length of 0.125, a width of 0.100, and a thickness of 0.013.

It is believed that the foregoing material describes the construction of the FIG. 3 transducer in a manner which is complete for the present purposes. A more detailed description of the FIG. 3 form of transducer will be found in the above-listed copending application.

OPERATION OF THE SENSOR AND TRANSDUCER OF FIGS. 1 THROUGH 3

As noted hereinbefore, the transducer of FIG. 3 is a fluid pressure to electric signal transducer. Specifically, the FIG. 3 transducer is a so-called differential pressure transducer, and is therefore arranged to produce an electrical resistance output signal which represents the difference between first and second applied fluid pressures. In operation, those two pressures are applied to act oppositely on the capsule member 27 so as to apply a force to the sensor 14 which deflects and strains the beam 1 to an extent which represents the difference between the two pressures.

Specifically, the first fluid pressure is applied to the exterior of the diaphragm 35, and the second fluid pressure is applied to the exterior of the diaphragm 51. This may well be accomplished by the use of conventional head covers with applied pressure supply connections (not shown) for each of the diaphragms 35 and 51, all as is shown in the above-listed Whitehead et al patent.

The first pressure acts to move the capsule member 27 upward, while the second pressure acts to move the member 27 downward. As a result, the vertical position of the right-hand end of the tube 19 is determined by the difference between the first and second pressures. When this pressure difference or differential pressure is equal to zero, it is assumed that the tube 19 occupies its undeflected position, in which the beam 1 also is in its undeflected and hence unstressed and unstrained position. Under this condition, the resistance output signal of the resistors 5, etc., as sensed between the pins 47, has a value corresponding to zero differential pressure.

Upon the occurrence of a change in one or both of the first and second pressures which establishes a new value of differential pressure across the diaphragms 35 and 51, the capsule member 27, the tube 19, and the beam 1 become correspondingly deflected. Consequently, the force on and the strain in the beam 1 and its resistors, and the sensor output signal, now change to values which represent the new differential pressure. It is in this manner that the FIG. 3 apparatus serves as a differential pressure transducer.

The sensitivity with which the FIG. 3 transducer operates to provide the above-noted output signal which represents the applied differential pressure is, of course, fundamentally dependent upon the strain sensitivity of the sensor 14. Due to the described silicon on spinel construction of the sensor 14, its sensitivity closely approaches that of a silicon on silicon counterpart, and is almost twice that of a silicon on sapphire counterpart. It appears that this is due to the existence of only a one to less than one-half stress transmission between a sapphire substrate and its silicon resistors, in contrast to the existence of an almost one to one stress transmission between a spinel substrate and its silicon resistors. This last-noted stress transmission figure closely approaches the substantially one to one stress transmission which is known to exist between the silicon substrate and the silicon resistors of a silicon on silicon sensor.

It appears that the reduced sensitivity of a silicon on sapphire sensor as compared to the sensitivities of comparable silicon on spinel and silicon on silicon sensors is consistent with the large differences which exist between the Young's modulus of $55 \times 10^6$ psi. for sapphire and the similar Young's moduli of $25 \times 10^6$ psi. and $29 \times 10^6$ psi. for silicon and spinel, respectively.

A desirable feature, then, of the silicon on spinel sensor, such as the sensor 14, is that it exhibits the above-described high stress transmission and sensitivity which are comparable to those of the silicon on silicon sensor, while also exhibiting the silicon on sapphire feature of freedom from leakage currents and the resulting unreliable operation.

Although the foregoing description deals with the operation of the sensor 14 as the sensor element of a differential pressure transducer, it is to be understood that the sensor operation would be essentially the same as described if the sensor were the element of one of the other known types of pressure transducers, such as those which respond to process pressures, absolute pressures, etc. Also, it is to be understood that essentially the same sensor operation occurs when the sensor is deflected by the other known forms of fluid pressure responsive devices, such as Bourdon tubes, bellows, spirals, and the like, or is deflected in use as a simple strain gauge attached to a strained member or as a part of a load cell.

THE SENSOR OF FIGS. 4 AND 5

The improved sensor according to the present invention may well have other forms than the beam form which has been described above. For example, the improved sensor may be a diaphragm form of sensor. An example of such a diaphragm form of sensor, constituting another preferred embodiment of the present invention, is shown in FIGS. 4 and 5.

Figure 4:
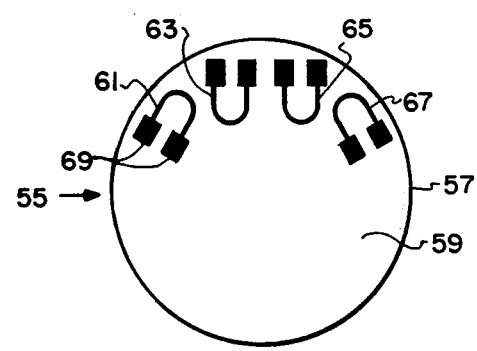
FIG. 4 is a diagrammatic top view of a diaphragm type of sensor constructed according to the present invention.
Figure 5:
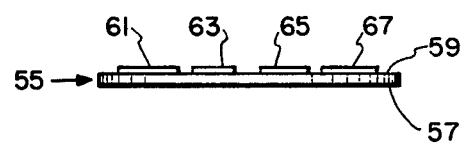
FIG. 5 is a front elevation of the sensor of FIG. 4.

The sensor of FIGS. 4 and 5 is designated herein by the reference numeral 55, and is shown as including a spinel body or substrate 57 which is in the form of a circular diaphragm. The upper face or surface 59 of the diaphragm 57 carries a pattern of four piezoresistive resistors which are shown schematically at 61, 63, 65, and 67. Those resistors may well be, and are assumed herein to be, produced in the manner which was described above for the production of the resistors 5, etc., of the sensor 14.

As shown, all of the resistors 61, 63, 65, and 67 are formed on the upper surface 59 of the diaphragm 57, with the resistors 63 and 65 having a substantially radial or longitudinal orientation, and the resistors 61 and 67 having a circumferential or transverse orientation. Accordingly, the sensor 55 is of the above-noted type wherein the resistors are oriented in both longitudinal and transverse directions on the same surface of the body. Consequently, the illustrated orientation permits the resistors 61, 63, 65, and 67 to be connected to form the arms of a bridge, as is the case for the resistors of the beam sensor 14.

To complete the construction of the sensor 55, suitable terminal pads 69 are produced on the diaphragm 57 in electrical contact with the ends of the resistors 61, 63, 65, and 67. In order to avoid unduly complicating the drawing, only the terminal pads 69 which are connected to the resistor 61 are labelled, and this is done only in FIG. 4. The pads 69 may well be produced by the usual plating process as in the case of the sensor 14.

OPERATION OF THE SENSOR OF FIGS. 4 AND 5

In practice, the sensor 55 may well be employed as the sensor element of a diaphragm type of fluid pressure transducer. When this is done, the diaphragm 57 and the resistors 61, 63, 65, and 67 will be deflected and strained in accordance with the fluid pressure or pressures to be sensed. The pads 69 will be connected to place the resistors 61, 63, 65, and 67 in a bridge, the output of which will represent the sensed pressure, all as in the case of the transducer of FIG. 3.

As an alternative to the specific arrangement shown in FIGS. 4 and 5, the resistors 61, 63, 65, and 67 may be oriented and directly bridge-connected on the diaphragm surface in the manner disclosed in the above-listed Frantzis patent.

The superior operation provided by the sensor 55 as a result of the above-described construction is basically the same as the above-described superior operation provided by the sensor 14. Specifically, when the sensor 55 is deflected and strained, as it is when it constitutes the sensor element of a diaphragm type pressure transducer, for example, the sensor 55 exhibits a high stress transmission and sensitivity which are comparable to those of the silicon on silicon sensor, while also exhibiting the silicon on sapphire feature of freedom from leakage currents and the resulting unreliable operation.

In the process of producing each of the above-described silicon layers which is selectively removed to leave the desired resistors in the making of a sensor according to the present invention, it is desirable to grow the silicon on the spinel so that the silicon layer is in the desired crystallographic plane of the silicon. This desired plane is that which permits the resistors to be placed in the crystallographic direction or directions which give the desired piezoresistive effects for the particular application. For example, I have discovered that a sensor of the type of the sensor 14 can be made to exhibit enhanced piezoresistive effects if the silicon is grown on the surfaces 3 and 9 in the (110) plane, and the resistors are oriented in the (110) plane in the <111> direction. Also, I have discovered that the sensor 55 can be made to exhibit enhanced linearity between force and output signal if the silicon is grown on the surface 59 in the (110) plane, the resistors 63 and 65 are oriented in the <111> direction, and the resistors 61 and 67 are oriented in the <11$\bar{2}$> direction. These desired piezoelectric effects are readily achievable, since silicon in the (110) plane is available on spinel. These effects cooperate with the above-noted desirably high degree of stress transmission to yield a sensor having a desirably high sensitivity and/or linearity. Additionally, the silicon on spinel sensor has the practical advantage of being more easily fabricated than the silicon on sapphire sensor, due to the fact that spinel can be cut more readily than can sapphire.

The above-noted enhanced effects represent improvements over those which are obtained for resistors oriented in the <1$\bar{1}$0> and/or <110> directions in the (100) plane of the silicon. However, silicon in the (100) plane is also available on spinel for those applications which dictate its use.

Although it is assumed in the foregoing description that the piezoresistive resistors are formed by the process of selectively etching doped silicon, it is to be understood that those resistors could be produced by others of the known processes for producing such resistors. For example, the epitaxially grown silicon layers could be pure silicon, and the resistors could be formed in such layers by suitably doping the layers in the desired resistor patterns. As previously noted, the same process for growing silicon on spinel as has been proposed for use in the manufacture of integrated circuits may be employed for growing the silicon layers on the spinel bodies or substrates in making the blanks for the sensors of the present invention.

Also, although the sensors which are illustrated herein are of the beam and diaphragm forms, it is to be understood that the improved sensors according to the invention can have spinel bodies in the forms of rings, cylinders, or any of the other known forms of bodies which are regularly used for load cells and strain gauges or strain sensors.

It is believed to be clear from the foregoing description that the described silicon on spinel sensors according to the present invention fulfill the objects stated herein. Thus, it has been shown that those sensors have the high sensitivity of the silicon on silicon sensors, have the reliable operation of the silicon on sapphire sensors, and additionally can be constructed to provide the desired piezoresistive effects due to the desirable crystallographic orientations which are readily obtainable with the silicon on spinel construction.

The embodiments of the invention in which an exclusive property or privilege is claimed are defined as follows:

1. A silicon strain sensor, comprising
   a body of spinel, and
   a silicon piezoresistive element grown on said body to enable a change in the stress in said body to be efficiently transmitted to said element,
   whereby the latter exhibits resistance changes which are a function of changes in the strain in said body.

2. A silicon strain sensor, comprising
   a body of spinel, and
   a plurality of piezoresistive silicon elements grown on said body to enable changes in the stress in said body to produce corresponding changes in the strains and resistances of said elements.

3. A piezoresistive strain sensor, comprising
   a body of spinel, and an epitaxially grown layer of silicon on a surface of said body, said layer being in the form of at least one piezoresistive element.

4. A piezoresistive silicon strain sensor, comprising
a body of spinel, and
an epitaxially grown layer of doped silicon on a surface of said body, said layer being in the form of at least one piezoresistive element having a resistivity dependent upon the doping level of said layer.

5. A piezoresistive silicon strain sensor, comprising
a body of spinel, and
a layer of silicon in the (110) crystallographic plane epitaxially grown on a surface of said body, said layer being in the form of at least one piezoresistive element formed in the <111> crystallographic direction.

6. A piezoresistive silicon strain sensor, comprising
a spinel beam having a pair of oppositely disposed faces, and
an epitaxially grown layer of silicon on each of said faces, each of said layers being in the form of at least one piezoresistive element.

7. A piezoresistive silicon strain sensor, comprising
a spinel beam having a pair of oppositely disposed faces,
an epitaxially grown layer of silicon on one of said faces, said layer being in the form of first and second piezoresistive resistors, and
an epitaxially grown layer of silicon on the other of said faces, the last-mentioned layer being in the form of third and fourth piezoresistive resistors oriented in the same crystallographic direction as said first and second resistors are oriented.

8. A sensor as specified in claim 7, wherein
said layers are in the (110) crystallographic plane, and
said resistors lie in the <111> crystallographic direction.

9. A piezoresistive silicon strain sensor, comprising
a spinel diaphragm having a pair of oppositely disposed faces, and
an epitaxially grown layer of silicon on one of said faces, said layer being in the form of at least one piezoresistive element.

10. A piezoresistive silicon strain sensor, comprising
a spinel diaphragm having a pair of oppositely disposed faces, and
an epitaxially grown layer of silicon on one of said faces, said layer being in the form of first and second piezoresistive resistors oriented substantially in the longitudinal crystallographic direction and third and fourth piezoresistive resistors oriented substantially in the transverse crystallographic direction.

11. A sensor as specified in claim 10, wherein
said layer is in the (110) crystallographic plane,
said first and second resistors lie substantially in the <111> crystallographic direction, and
said third and fourth resistors lie substantially in the <11$\bar{2}$> crystallographic direction.

12. A pressure to electrical signal transducer including
a spinel beam having a pair of oppositely disposed faces and having an epitaxially grown layer of silicon in the form of a piezoresistive resistor on one of said faces,
support means attached to one end of said beam to cantilever said beam from said support means,
means responsive to fluid pressure connected to the other end of said beam to deflect said other end and to strain said beam and said resistor by an amount dependent upon said pressure, and
terminals electrically connected to said resistor, between which terminals the resistance is dependent upon the extent of said deflection and straining of said beam and said resistor.

* * * * *